United States Patent [19]

Clough et al.

[11] Patent Number: 4,861,689
[45] Date of Patent: Aug. 29, 1989

[54] BATTERY ELEMENT AND METHOD FOR MAKING SAME

[75] Inventors: Thomas J. Clough, Santa Monica; Naum Pinsky, Thousand Oaks, both of Calif.

[73] Assignee: Ensci, Inc., Woodland Hills, Calif.

[21] Appl. No.: 123,896

[22] Filed: Nov. 23, 1987

[51] Int. Cl.[4] ............ H01M 4/16; H01M 6/48
[52] U.S. Cl. ............ 429/210; 429/225; 429/234; 29/623.5
[58] Field of Search ............ 429/210, 234, 233, 225, 429/228, 212; 29/623.1, 623.5; 252/182.1; 428/432

[56] References Cited

U.S. PATENT DOCUMENTS

| | | | |
|---|---|---|---|
| 2,471,781 | 5/1949 | Schmidt | 429/210 X |
| 4,510,219 | 4/1985 | Rowlette | 429/245 X |
| 4,562,113 | 12/1985 | Yonahara et al. | 429/210 X |
| 4,625,395 | 12/1986 | Rowlette | 29/623.5 X |

*Primary Examiner*—Anthony Skapars
*Attorney, Agent, or Firm*—Frank J. Uxa

[57] ABSTRACT

In a method for producing a battery element useful as at least a positive plate in a lead-acid battery, the element comprising a fluid impervious, electrically conductive matrix having mutually opposing first and second surfaces and positive active electrode material associated with the first surface of the matrix, the improvement which comprises:

conditioning the first surface to enhance the association of the positive active electrode material and the first surface; and applying and associating the positive active electrode material to the first surface.

86 Claims, 1 Drawing Sheet

BATTERY ELEMENT AND METHOD FOR MAKING SAME

The invention described herein was made in the performance of work under a NASA Contract Pursuant to Public Law 96-517 (35 U.S.C. 202), the contractor has elected to retain title.

TECHNICAL FIELD

The present invention relates to battery elements useful in lead-acid batteries. More particularly, the invention relates to battery elements for use in lead-acid batteries, which elements include a substrate having a conductive coating.

BACKGROUND ART

Even though there has been considerable study of alternative electrochemical systems, the lead-acid battery is still the battery of choice for general purposes, such as starting a vehicle, boat or airplane engine, emergency lighting, electric vehicle motive power, energy buffer storage for solar-electric energy, and field hardware, both industrial and military. These batteries may be periodically charged from a generator.

The conventional lead-acid battery is a multi-cell structure. Each cell comprises a set of vertical positive and negative plates formed of lead-acid alloy grids containing layers of electrochemically active pastes. The paste on the positive plate when charged comprises lead dioxide, which is the positive acting material, and the negative plate contains a negative active material such as sponge lead. An acid electrolyte, based on sulfuric acid, is interposed between the positive and negative plates.

Lead-acid batteries are inherently heavy due to use of the heavy metal lead in constructing the plates. Modern attempts to produce light-weight lead-acid batteries, especially in the aircraft, electric car and vehicle fields, have placed their emphasis on producing thinner plates from lighter weight materials used in place of and in combination with lead. The thinner plates allow the use of more plates for a given volume, thus increasing the power density.

Higher voltages are provided in a bipolar battery including bipolar plates capable of through-plate conduction to serially connected electrodes or cells. The bipolar plates must be impervious to electrolyte and be electrically conductive to provide a serial connection between electrodes.

U.S. Pat. Nos. 4,275,130; 4,353,969; 4,405,697; 4,539,268; 4,507,372; 4,542,082; 4,510,219; and 4,547,443 relate to various aspects of lead-acid batteries. Certain of these patents discuss various aspects of bipolar plates.

One problem which has presented itself, particularly with regard to bipolar plates, is maintaining the integrity of the plate as the battery is repeatedly cycled between charge and discharge modes. For example, in certain previous bipolar plate configurations, the positive active electrode material, which is originally adhered to an electrically conductive matrix, separates from the matrix after repeated charge/discharge cycles. Also, such charge/discharge cycles tend to cause portions of the positive active electrode material to shed, drop or flake off the mass of this material. Both of these phenomena reduce the effectiveness and effective life of the battery containing such plates.

Commonly assigned U.S. patent applications Ser. Nos. 843,047, filed Mar. 24, 1986, now U.S. Pat. No. 4,713,306, and 843,053, filed Mar. 24, 1986, now U.S. Pat. No. 4,708,918, disclose improved lead-acid battery elements. The disclosure of each of these applications is incorporated in its entirety herein by reference. However, neither of these applications specifically addresses the problems discussed in the preceding paragraph.

SUMMARY OF THE INVENTION

A new battery element useful as at least a positive plate in a lead-acid battery has been discovered. The present battery element comprises a fluid impervious, electrically conductive matrix having mutually opposing first and second surfaces, and positive active electrode material associated with the first surface of the matrix.

The present invention provides substantial advantages. For example, battery elements in accordance with this invention are produced and/or structured so that the association between the matrix and the positive active electrode material is enhanced, e.g., relative to prior art configurations. In addition, the positive active electrode material has improved integrity and effectiveness. That is, the positive active material more effectively holds together (remains intact with a reduced rate of flaking off) and functions over a longer period of charge/discharge cycling relative to prior art elements. The present invention is particularly applicable to bipolar plates for lead-acid batteries.

In one embodiment of the present invention the positive active electrode material is associated with, preferably adhered to, the first surface of the matrix and is situated in a plurality of individual segments. Each segment is preferably predominantly physically isolated from the other segment or segments. Dividing or segmenting, and preferably predominantly isolating, the positive active electrode material provides very useful electrical properties, e.g., electrical response stability or consistency, as well as good physical or structural integrity as the battery element is repeatedly cycled between charge and discharge modes. For example, segmenting the positive active electrode material reduces the rate at which this material flakes off. In addition, the relatively small segments of positive active electrode material appear to more effectively withstand the changes caused by cycling between the charge and discharge modes. Isolating the segments reduces the adverse effects which may be caused by localized defects in the positive active electrode material and/or the matrix.

For most lead/acid battery applications, each of the segments preferably has an area in the range of about 0.1 square inch to about 2.5 square inches, more preferably about 0.35 square inch to about 2 square inches and still more preferably about 0.5 square inch to about 1.25 square inches. Although the segments may be of any shape, it is preferred that the segments be substantially rectangular, more preferably substantially square, in shape.

In one embodiment, the present battery element further comprises segmenting means associated with the first surface of the fluid impervious, electrically conductive matrix, e.g., matrix layer. Such segmenting means acts to keep the segments of the positive active electrode material physically isolated from each other. The segmenting means may be constructed of any suitable material or materials, provided that the segmenting means effectively functions as described herein. The segmenting means may be electrically conductive or not. Examples of suitable materials of construction for the segmenting means include metals, preferably lead, polymers and ceramics. Of course, the material or materials chosen should be compatible with the environment in a lead-acid battery and should have no substantial or undue detrimental effect on the functioning of the battery.

In one particularly useful embodiment, the segmenting means is of substantially the same composition as the matrix. For example, as is described below, the matrix preferably includes a polymeric material. Thus, the segmenting means may include polymer material having substantially the .same composition as the polymeric material included in the matrix. Further, the composition of the segmenting means may be substantially the same as the composition of the matrix. For example, if, as is preferred, the matrix includes a coated substrate to provide electrical conductivity, the segmenting means may also include such coated substrate. The embodiment in which the matrix and the segmenting means are of substantially the same composition is particularly useful since a combination matrix-segmenting means can be relatively easily manufactured. For example, the matrix and segmenting means can be formed as a single unitary structure. This adds to the structural integrity of the present system.

In another broad aspect of the present invention, the positive active electrode material is associated with, preferably adhered to, a conditioned first surface of the matrix. The conditioning of the first surface of the matrix material enhances the association, e.g., adhesion, of the positive active electrode material to the matrix. This enhancement adds to the structural integrity, and performance characteristics and durability of the present battery element. Thus, the first surface of the matrix layer is conditioned, preferably prior to the positive active electrode material becoming associated with such surface, to enhance the first surface/positive active electrode material association. In a particularly useful embodiment, the positive active electrode material is adhered to the first surface which is conditioned, preferably prior to the positive active electrode material being adhered thereto, to enhance the adhesion of the material to the surface.

The several embodiments of the present invention may be employed alone or together, as desired. For example, a segmented positive active electrode material may be associated with a conditioned first surface of the matrix material.

The first surface of the matrix material may be conditioned in any suitable manner, provided that after such conditioning, or as a result of such conditioning, the association between the positive active electrode material and the first surface of the matrix material is enhanced, e.g., is stronger. In other words, conditioning the first surface of the matrix material enhances this association relative to the association obtained in the absence of such conditioning.

In one embodiment, the conditioning renders the first surface of the matrix material more wettable by the positive active electrode material or precursor thereof. For example, the conditioning may comprise contacting the first surface with a wetting agent. Any suitable wetting agent or combination of wetting agents may be employed, provided that they function to condition the first surface as described herein and have no undue detrimental effect on the present battery element or battery. Examples of wetting agents include ethylene oxide based agents which are substantially nonionic and can be characterized on the basis of hydrophilic/hydrophobic balance, often referred to as HLB (Hydrophilic Lipophilic Balance) number. Such agents included phenol surfactants having ethylene oxide groups, ethoxylated fatty alcohol ethers, ethoxylated fatty acids, ethoxylated adducts of propylene oxide with propylene glycol, phosphate ether ethoxylates and mixtures thereof. Of course, other wetting agents may be employed.

The wetting agent may be contacted with the matrix material at any time before, during or after formation of the matrix material, e.g., matrix layer. For example, the wetting agent may be incorporated into the matrix material, or precursor thereof when compatible from a polymer blend standpoint, and/or may be contacted, e.g., in a liquid medium or in the liquid phase, with the matrix material after formation of the matrix material to condition the first surface thereof. A particularly effective treatment after matrix formation comprises contacting the matrix with an acid, preferably $H_2SO_4$ at a concentration of about 70% to about 90% for a time in the range of about 1 second to about 5 seconds.

In many instances, the conditioning acts to increase the hydrophilic nature, e.g., reduce the hydrophobic nature, of the first surface of the matrix material, which is often inherently hydrophobic. Such conditioning is particularly useful where, as is preferred, the positive active electrode material or precursor thereof is applied in an aqueous medium to the first surface of the matrix material.

One useful method for increasing the hydrophilic nature of the first surface comprises attaching, e.g., chemically bonding, hydrophilic groups to the matrix material at or near the first surface. For example, if the matrix material is a polymeric material which includes hydrophobic groups, the matrix material can be contacted with a polyfunctional component, e.g., a polyfunctional or a dicarboxylic acid, including hydrophilic functional groups at least one of which is capable of reacting with the hydrophobic groups of the matrix material so that at least one of such functional groups reacts with a hydrophobic group in the matrix material. This contacting increases the hydrophilic nature of the matrix material only one of the above-noted hydrophilic functional groups reacts, chemically bonds hydrophilic groups to the matrix material at or near the first surface. Any suitable polyfunctional component may be employed provided that such component functions as described herein and does not unduly detrimentally affect the present battery element or battery.

Another method of conditioning the first surface comprises subjecting the first surface to the action of a plasma, preferably in an oxidizing medium. The medium more preferably includes ozone. Such plasma treatment increases the hydrophilic nature of the first surface, preferably by attaching hydrophilic groups to the matrix material at or near the first surface thereof. Care should be exercised to avoid prolonged exposure of the matrix to the plasma so that no significant reduction in the overall strength, integrity and electrical properties of the matrix material occurs. The plasma may be generated in any suitable, e.g., conventional, manner.

A further method of conditioning the first surface comprises using a coupling material on the first surface. This method is particularly useful where the matrix is hydrophobic in nature and the positive active electrode material is applied to the first surface in an aqueous medium. Such coupling materials in general have the capability of associating with both the matrix material and the positive active electrode material, or precursor thereof. Such coupling materials may be physical mixtures of two or more components, with one component being compatible (easily or readily associated) with the matrix material and another component being compatible with the positive active electrode material or precursor thereof. Of course, the coupling material and components thereof should have no undue detrimental effect on the present battery element or battery. The coupling material is preferably applied to the first surface before the positive active electrode material or precursor thereof is introduced.

One particularly useful coupling material comprises a mixture containing a polymer effective to wet the first surface of the matrix material, and the positive active electrode material or precursor thereof. Any suitable polymer or combination of polymers may be employed provided that such polymer or polymers function as described herein. An especially useful group of polymers includes polyacrylic acid, poly-hydroxyethylmethacrylate and mixture thereof. The first surface of the matrix material is preferably coated with a thin film of a mixture of the polymer and electrode material or precursor, more preferably in an aqueous medium. After this coating, the water or other solvent is evaporated or otherwise removed and the polymer and/or electrode material or precursor may be cured, if desired. The bulk of the positive active electrode material or precursor thereof is then applied to the conditioned first surface and the electrode material or precursor is cured, e.g., in a conventional manner.

Any suitable positive active electrode material or combination of such materials useful in lead-acid batteries may be employed in the present invention. The positive active electrode material is preferably lead dioxide. The positive active electrode material can be prepared by dispersing lead dioxide particles in water to form a paste. Alternately, a positive active electrode material precursor paste of lead sulfate and litharge (PbO) in water can be used. After the paste is applied to the first surface of the matrix material, it is dried and cured. The precursor paste may be converted to lead dioxide by applying a charging potential to the paste.

The present battery element preferably comprises an acid resistant substrate at least partially coated with an electrically conductive coating such that at least a portion of the coated substrate is embedded in the matrix or matrix layer to form a fluid impervious conductive composite. In this embodiment, the positive active electrode material is situated such that at least a portion of the coated substrate contacts the electrode material. In a further embodiment, the battery element last described above further comprises a fluid-impervious conductive layer that is adjacent to, and in electrical communication with, the second surface of the matrix layer. In yet another embodiment, the element last described above further comprises a negative active electrode layer located adjacent to, and in electrical communication with the fluid impervious conductive layer.

Any suitable, preferably polymeric, matrix material having the stability at conditions present in a lead-acid battery may be used to embed a least a portion of the substrate. The matrix material should be at least initially fluid impervious to be useful in the present battery elements and batteries. Preferably the matrix material comprises one or more synthetic polymers. The matrix or matrix layer preferably comprises polymer having increased polarity relative to polypropylene. The polymeric material may be either a thermoplastic material or a thermoset material. Thermoplastic materials are those which can be softened with heat and while soft can be molded, cast, or extruded under pressure. Thermosetting materials are those which are changed chemically by the application of heat to become hard, dense, insoluble, and infusible substances. Among the polymers particularly useful in the present invention are polymers derived from a monomer component comprising a major amount of weight of at least one substantially hydrocarbonaceous compound, more preferably selected from the group consisting of olefins and diolefins (both aliphatic and aromatic) having 2 to about 12 carbon atoms per molecule and a minor amount by weight of at least one additional monomer effective to increase the polarity of the polymer. If the polymeric matrix material is to be a thermoplastic polymer, it is preferred that the matrix be substantially hydrocarbon-based and include one or more groups effective to increase the polarity of the polymer relative to polypropylene. Additive or additional monomers, such as maleic anhydride, vinyl acetate, acrylic acid, and the like and mixtures thereof, may be included prior to polymerization to give the substantially hydrocarbon-based polymer increased polarity. Hydroxyl groups may also be included in a limited amount, using conventional techniques, to increased the polarity of the final substantially hydrocarbon-based polymer.

By "substantially hydrocarbonaceous" and "substantially hydrocarbon-based" is meant those compounds and polymers, respectively, which comprise mainly carbon and hydrogen atoms. These compounds and polymers may include minor amounts of one or more non-hydrocarbon groups, e.g., to provide the presently preferred increased polarity, provided that such non-hydrocarbon groups do not substantially interfere with the functioning of the present battery elements and batteries. Among the non-hydrocarbon groups which may be included are those groups which contain halogens, sulfur, nitrogen, oxygen, phosphorous and the like.

Among the preferred thermoplastic polymer matrix materials include co-polymers of additional monomers and olefins such as ethylene, propylene, butylenes, pentenes, hexenes, styrene and mixtures thereof. Other preferred thermoplastic polymers include polyvinyldene difluoride, combinations of polyphenylene oxide and polystyrene and mixtures thereof.

Because of weight and strength considerations, if the polymeric matrix material is to be a thermoplastic polymer, it is preferred that the matrix be a polypropylene-based polymer which includes one or more groups effective to increase the polarity. The preferred additional monomer is maleic anhydride, more preferably present in the polymer in an amount in the range of about 0.1% to about 10% by weight, more preferably about 1% to about 5% by weight.

Thermoset polymers, which have increased polarity relative to polypropylene and are stable at the conditions present in a lead-acid battery, are more preferred for use in the present polymeric matrix materials. The viscosity properties and flexibility of certain of these thermoset polymers provide for ease of manufacturing the preferred coated acid resistant substrate-matrix material composite of the present battery elements. For example, the coated substrate may be at least partially embedded in the thermoset polymer or polymer precursor prior to the final polymerization of the thermoset polymer. More effective bonding of the coated substrate with thermoset polymeric matrix materials is achieved. This bonding is important to provide increased protection for the coated substrate at the aggressive conditions present in lead-acid batteries.

The thermoset polymers useful in the present invention are selected from the group consisting of epoxies, phenol-formaldehyde polymers, polyesters, polyvinyl esters, polyurethanes, melamine-formaldehyde polymers and urea-formaldehyde polymers. Each of these classes of polymers represents many individual polymers, the composition of which can be varied by selecting different monomers and/or adjusting the ratio or ratios of the monomers used to produce the thermoset polymer. These thermoset polymers may be produced using conventional techniques, well known in the art. Therefore, no further discussion of such techniques is presented here. More preferably, the thermoset polymers are selected from the group consisting of epoxies, phenol-formaldehyde polymers, polyesters and polyvinyl esters, especially polyvinyl esters having terminal vinyl groups.

Various techniques, such as casting, molding and the like, may be used to at least partially embed the coated substrate into the matrix material. The choice of technique may depend, for example, on the type of matrix material used, the type and form of the substrate used and the specific application involved. Certain of these techniques are presented in U.S. Pat. No. 4,547,443, the entire disclosure of which is hereby incorporated by reference herein. One particular embodiment involves preimpregnating (or combining) that portion of the coated substrate to be embedded in the matrix material with a relatively polar (increased polarity relative to polypropylene) thermoplastic polymer, such as polyvinylidene difluoride, prior to the coated substrate being embedded in the matrix material. This embodiment is particularly useful when the matrix material is itself a thermoplastic polymer, such as polypropylene, and has been found to provide improved bonding between the coated substrate and the matrix material.

The substrate is preferably acid resistant. That is, the substrate preferably exhibits resistance to corrosion, erosion and/or other forms of deterioration at the conditions present, e.g., at or near the positive plate, or positive side of the bipolar plates, in a lead-acid battery. Although the coating often provides a degree of protection for the substrate against these conditions, the substrate itself preferably has an inherent degree of acid resistance. If the substrate is acid resistant, the physical integrity and electrical effectiveness of the coating and of the whole present battery element, is better maintained with time relative to a substrate having reduced acid resistance. If glass is used as the substrate, it is preferred that the glass have an increased acid resistance relative to E-glass. Preferably, the acid resistant glass substrate is at least as resistant as is C-glass to the conditions present in a lead-acid battery.

Typical compositions of E-glass and C-glass are as follows:

|  | Weight Percent | |
| --- | --- | --- |
|  | E-glass | C-glass |
| Silica | 54 | 65 |

|  | Weight Percent | |
| --- | --- | --- |
|  | E-glass | C-glass |
| Alumina | 14 | 4 |
| Calcia | 18 | 14 |
| Magnesia | 5 | 3 |
| Soda + Potassium Oxide | 0.5 | 9 |
| Boria | 8 | 5 |
| Titania + Iron Oxide | 0.5 | — |

Preferably the glass contains more than about 60% by weight of silica and less than about 35% by weight of alumina, and alkali and alkaline earth metal oxides.

The acid resistant substrate is preferably in the form of particles, flakes or fibers. The substrate may be organic or inorganic. For example, the substrate may comprise an organic-based polymer material, a ceramic, a glass or like material. Because of availability, cost and performance considerations, it is preferred that the substrate be in the form of fibers. The presently useful fibers preferably are in a form selected from the group consisting of fiber rovings, chopped fibers, single fibers, woven fibers and the like. In order to provide improved point-to-point contacting in the fibrous substrate, which is highly desirable for improved conductivity and electrical effectiveness of the lead-acid battery, the substrate more preferably is in the form of a body of woven fibers, still more preferably, having a porosity in the range of about 60% to about 95%. Porosity is defined as the percent or fraction or void space within a body of woven fibers. The above-noted porosities are calculated based on the woven fibers including the conductive coating.

The substrate, because of availability, cost and performance considerations, preferably comprises acid resistant glass, more preferably in the form of glass fibers.

The coating on the substrate is to be electrically conductive. Among the coatings which may be used are metal oxides, preferably metal oxides which are doped with one or more ions to provide for increased electrical conductivity. One particularly preferred metal oxide coating is tin oxide (stannic oxide) which is itself stable at the conditions present in a lead-acid battery.

Any suitable dopant may be used to dope the metal oxide, preferably tin oxide, coating. Such dopant or combination of dopants should be such as to be effective to improve the electric conductivity (reduce the resistivity) of the coating on the substrate. The preferred dopant for the coating is selected from the group consisting of fluoride ion, antimony ion and mixtures thereof. Fluoride ion is particularly preferred since it is especially tolerant of the aggressive environment in a lead-acid battery. The amount of dopant present in the coating may vary widely, provided that the amount present is effective to improve the electrical conductivity of the coating with no dopant present. If fluoride ion is to be used as a dopant, it is preferred that the fluoride ion be present in the coating, e.g., tin oxide coating, in an amount in the range of about 0.01 mole % to about 20 mole %, based on the entire doped tin oxide coating.

The coating on the acid resistant substrate is typically such that satisfactory electrical conductivity is achieved. As noted previously, this coating may also act to physically protect the substrate from the battery environment. The thickness of the coating may vary widely and depends, for example, on the electric conductivity desired, on the coating material being used, and on the type and amount of substrate. The thickness of the coating may be as little as a molecular monolayer. Preferably, the coating has an average thickness in the range of about 0.01 micron to about 10 microns, particularly when the substrate is in the form of glass fibers having an average diameter in the range of about 1 micron to about 20 microns and the average length to diameter ratio of the glass fibers is in the range of about 100,000 to about 2,000,000.

Any suitable process may be employed to apply the coating, e.g., doped tin oxide coating, onto the substrate. The primary criterion for such processing is that an effective coating results. Where, as is preferred, the acid resistant substrate is in the form of particles or fibers, the preferred doped tin oxide coating is preferably applied using spray pyrolysis or a new chemical vapor deposition process discussed in the above-noted U.S. Patent application Ser. No. 843,047. The coating may also be applied using sol-gel techniques.

The bonding between the matrix material and the coated, acid resistant substrate is important to provide effective battery operation. In order to provide for improved bonding of the coating e.g., a doped tin oxide coating, (on the substrate) with the matrix material, it is preferred to at least partially, more preferably substantially totally, coat the coated substrate with a coupling agent which acts to improve the bonding of the electrically conductive coating with the matrix. This is particularly useful when the substrate comprises acid resistant glass fibers and the electrically conductive coating is doped tin oxide. Any suitable coupling agent may be employed. Such agents preferably comprise a polar portion and a non-polar portion. Certain materials generally in use as sizing for glass fibers may be used here as a "size" for the coated glass fibers. The amount of coupling agent used to coat the coated glass fibers should be effective to provide the improved bonding noted above and, preferably, is substantially the same as is used to size bare glass fibers. Preferably, the coupling agent is selected from the group consisting of silanes, silane derivatives, stannates, stannate derivatives, titanates, titanate derivatives and mixtures thereof. U.S. Pat. No. 4,154,638 discloses silane-based coupling agents adapted for use with tin oxide surfaces. The entire disclosure of this patent is hereby expressly incorporated by reference herein.

In the embodiment in which the present battery element is at least a portion of a bipolar plate in a lead-acid battery, it is preferred that the element further comprises a fluid-impervious conductive layer that is resistant to reduction adjacent to, and preferably in electrical communication with, the second surface of the matrix material. The conductive layer is preferably selected from metals, more preferably lead, and substantially non-conductive polymers, more preferably synthetic polymers, containing conductive material. The non-conductive polymers may be chosen from the polymers discussed previously as matrix material. One particular embodiment involves using the same polymer in the matrix material and in the non-conductive polymer. The electrically conductive material contained in the non-conductive layer preferably is selected from the group consisting of graphite including carbon, lead and mixtures thereof.

In the bipolar plate configuration, the present battery element further comprises a negative active electrode layer located adjacent to, and preferably in electric communication with, the fluid impervious conductive layer. Any suitable negative active electrode material useful in lead-acid batteries may be employed in the present invention. One particularly useful negative active electrode material comprises lead, e.g., sponge lead. Lead paste is often used.

Certain of these and other aspects of the present invention are set forth in the following description, particularly when considered in conjunction with the accompanying drawings in which like parts bear like reference numerals.

DETAILED DESCRIPTION OF PREFERRED EMBODIMENT

Figure 1:
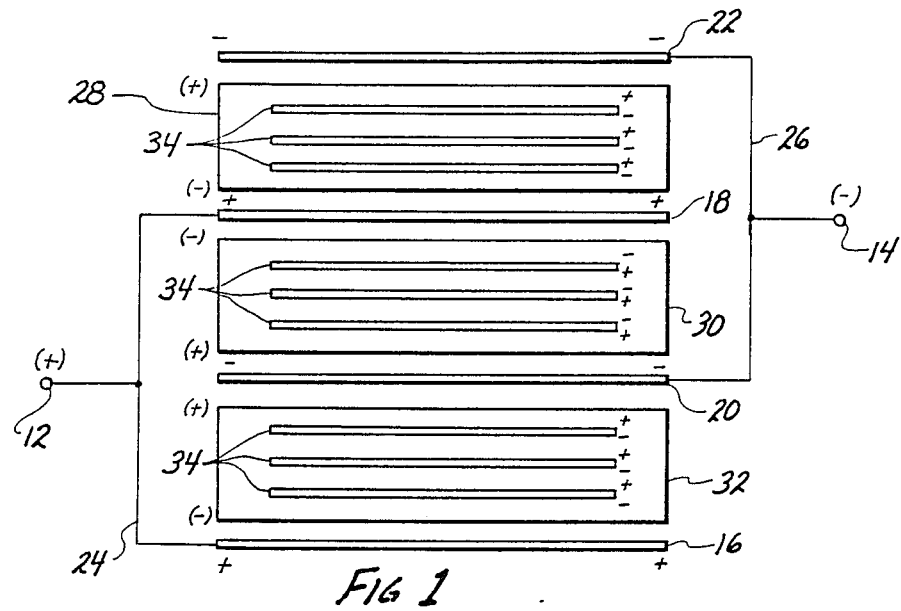
FIG. 1 is a schematic diagram of the series-parallel electrical connection o bipolar and monopolar plates.

Referring now to FIG. 1, a schematic representation of a bipolar battery 10 is shown, comprising a positive terminal 12 and a negative terminal 14. Battery 10 includes a monopolar grid or plate stack having two positive monopolar plates 16 and 18 and two negative monopolar plates 20 and 22.

Monopolar plates 16, 18, 20, 22 are stacked vertically with suitable electrolyte layers (not shown) provided. Positive monopolar plates 16 and 18 are connected in parallel by a bus bar, shown schematically at 24, to positive terminal 12 to provide an electric potential of about eight volts. The amount of current is determined by the size of positive monopolar plates 16 and 18. Negative monopolar plates 20 and 22 are connected by a bus bar, shown schematically at 26, to negative terminal 14 to also provide a voltage potential of about eight volts and a current varying depending upon the size of negative monopolar plates 20 and 22.

As is known in bipolar battery technology, bipolar plate groupings 28, 30, 32 are inserted between the monopolar plates 16, 18, 20, 22. Bipolar plate groupings 28, 30, 32 are positioned so that their uppermost and lowermost positive sides are adjacent to one of negative monopolar plates 20 and 22 and their uppermost and lowermost negative sides are adjacent to one of positive monopolar plates 16 and 18. Bipolar plate groupings 28, 30, 32 include a series of vertically stacked bipolar plates 34. Bipolar plates 34 are stacked vertically with suitable electrolyte layers (not shown) provided between bipolar plates 34 to provide a bipolar plate grouping having variable voltage depending upon the number of bipolar plates 34 present in a given grouping. It will be appreciated that the bipolar plate grouping is not connected to bus bars 24 and 26, but rather is secured within the battery stack by suitable non-conductive means (not shown).

Figure 2:
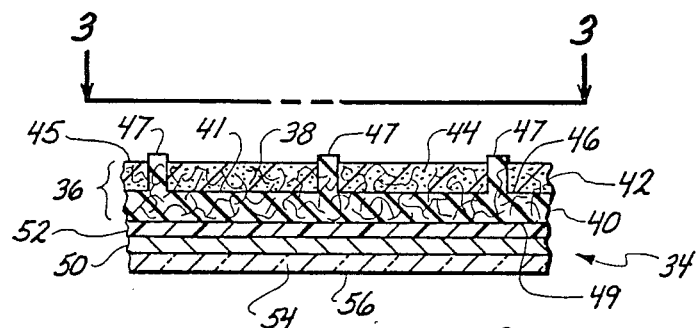
FIG. 2 is a cross-section of a bipolar plate for a lead-acid battery incorporating doped tin oxide coated acid resistant substrate, segmented positive active electrode material and a matrix layer having a conditioned first surface.

Referring now to FIG. 2, a unitary, bipolar battery plate 34 is illustrated. Plate 34 comprises a body 36 of woven fiberglass with the glass being C-glass (with a composition substantially as indicated previously), the strands 38 of which contain a coating of electrically conductive fluoride ion doped tin oxide. Body 36 has a porosity of about 75%. The average diameter of the individual fibers or strands 38 in body 36 is about 5 microns. The average thickness of the doped tin oxide coating is about 1 micron and about 2 mole % of the coating is fluoride ion.

The lower portion of fiberglass body 36 is embedded in a layer 40 of synthetic, epoxy-type thermoset polymer forming a fluid-impervious, through-conductive substrate.

The lower portion of body 36 may be embedded in thermoset layer 40 using various techniques. It is preferred that the lower portion of body 36 be contacted with the material making up thermoset layer 40 before the thermoset polymer is fully cured. One of the advantages of using thermoset polymers, such as epoxies, for layer 40 is that the viscosity of the monomers or pre-polymers is sufficiently low to allow the doped tin oxide coated substrate, e.g., fiberglass body 36 to be contacted with the monomers or pre-polymers with no substantial undue breakage of the substrate, e.g., individual glass fiber strands within body 36. This low viscosity of the thermoset's monomers or pre-polymers provides for improved control over the manufacture of the doped tin oxide coated substrate-matrix composite. Prior to being partially embedded in layer 40, body 36 (including the doped tin oxide coating) is coated with a silane derived coupling agent as described in U.S. Pat. No. 4,154,638 to improve the bonding of body 36 with layer 40.

One of the disadvantages of using thermoset polymers is that, for the most part, they are hydrophobic in nature. The positive active electrode layer 42 is preferably applied to the first surface 41 of thermoset layer 40 in the form of an aqueous paste. In accordance with the present invention first surface is conditioned to be more compatible with and/or wettable by this aqueous paste. This has been found to substantially enhance the adhesive strength between the electrode layer 42 and the thermoset layer 40. The conditioning can occur, for example, by exposing first surface 41 to an oxidizing plasma; by treating first surface 41 with a wetting agent, such as a conventional nonionic surfactant; or by coating first surface 41 with a thin film of an aqueous coupling material including lead oxide or lead oxide precursor and a polymer, such as polyacrylic acid and the like. Such conditioning takes place before the aqueous paste containing the bulk of the positive active electrode material, a precursor thereof, is applied to the conditional first surface.

The paste containing the positive active electrode material or precursor thereof can be prepared in accordance with methods well established in the art. For example, the lead dioxide particles 44 can be dispersed in water to form a paste. The paste is then placed on the first surface 41 of the thermoset layer 40 substantially completely surrounding that part of body 36 which extends out of first surface 41, and the paste is dried. Alternately, a precursor paste of lead sulfate and litharge (PbO), such as one containing 75% lead sulfate and 25% litharge, in water can be used in place of the lead dioxide paste. After being applied, the electrode material or precursor is cured, e.g., using conventional techniques, to form positive active electrode layer 42. The paste is converted to lead dioxide by applying a charging potential to the paste.

Figure 3:
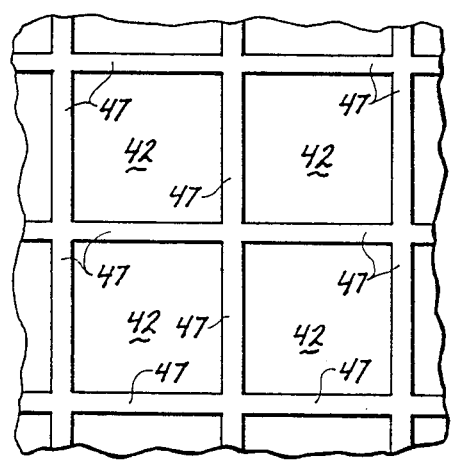
FIG. 3 is a plan view taken along line 3—3 of FIG. 2.

Referring now to FIG. 3, thermoset layer 40 includes a system of ridges 47 which extend outwardly from first surface 41 to form a grid. These ridges 47 define a series or plurality of square segments into which positive active electrode layer 42 is placed. Each of the segments has an area of one square inch. The ridges 47 extend for a sufficient height above the first surface 41 so that the individual segments of positive active electrode layer 42 are predominantly physically isolated from each other. In general, the positive active electrode layer 42 is similar in vertical height to ridges 47. It has been found that dividing the positive active electrode layer 42 into relatively small segments provides improved electrical properties, e.g., stability, as well as improved physical or structural integrity, particularly as the battery cycles repeatedly between charge and discharge modes.

The upper portion of body 36 contains lead dioxide forming a positive active electrode layer 42. The particles 44 of lead dioxide are in contact with strands 38 which form conduction paths from top surface 45 to bottom surface 46 of layer 42.

The thickness of the resin layer 40 is preferably in the range of about 1 to about 20 mils, more preferably about 4 to about 10 mils.

A layer 50, which is conductive and stable under reducing conditions, is adhered to plate 34 by a conductive adhesive such as a film 52 of graphite-filled epoxy adhesive. Layer 50 can be a thin film or foil of lead preferably having a thickness in the range of 0.5 to about 10 mils, more preferably about 1 to about 5 mils. The fabrication of the bipolar plate is completed by depositing a layer 54 of negative active material, such as lead paste, onto layer 50 supported by a sheet 56 of glass scrim. Alternately, negative active material layer 54 can be placed directly in contact with thermoset layer 40. In this embodiment, the second surface 49 of thermoset layer 40 can be conditioned in a manner similar to first surface 41. Also thermoset layer 40 can be fabricated so that ridges similar to ridges 47 extend from second surface 49.

Battery 10 is placed in service and performs well in both the charge and discharge modes. The doped tin oxide coating on body 36 provides adequate conductivity. Importantly, this performance continues after a period of time in charge/discharge cyclic operation. This performance stability is vital in many lead-acid battery applications. Thus, the doped tin oxide coated, acid resistant glass fibers of body 36 have substantial stability at the aggressive, acidic/oxidative conditions present on the positive side of bipolar plates 34. In addition, the present system provides for outstanding adhesion between thermoset layer 47 and the positive active electrode material 42 in segments defined by ridges 47. This improvement is manifested in the reduced rate at which positive active electrode material is lost from the segments. In addition, the relatively small size of the isolated segments reduces or eliminates the problem of local "hot spots" of deleterious crystal growth propagating over the entire plate. If one segment becomes ineffective, the remaining segments are substantially unaffected. Improved association, e.g., adhesion, between the positive active matrix material and the matrix material at conditions present in the lead-acid battery is one of the primary advantages of the present invention.

While the invention has been described with respect to various specific embodiments and examples, it is understood that the invention is not limited thereto and that it can be variously practiced within the scope of the following claims.

What is claimed is:

1. In a method for producing a battery element useful as at least a positive plate in a lead-acid battery, said element comprising a fluid impervious, electrically conductive matrix having mutually opposing first and second surfaces and positive active electrode material associated with said first surface of said matrix, the improvement which comprises:

conditioning said first surface to render said first surface more wettable by said positive active electrode material or a precursor thereof to enhance the association of said positive active electrode material and said first surface; and applying and associating said positive active electrode material to said first surface.

2. The method of claim 1 wherein said conditioning comprises contacting said first surface with a wetting agent.

3. The method of claim 1 wherein said conditioning increases the hydrophilic nature of said first surface.

4. The method of claim 1 wherein said conditioning acts to attache hydrophilic groups to said matrix at or near said first surface.

5. The method of claim 1 wherein said conditioning comprises subjecting said first surface to the action of a plasma.

6. The method of claim 1 wherein said conditioning comprises subjecting said first surface to the action of a plasma in an oxidizing medium.

7. The method of claim 1 wherein said oxidizing medium contains ozone.

8. The method of claim 1 wherein said conditioning comprises applying a coupling material to said first surface.

9. The method of claim 8 wherein said coupling material comprises a mixture containing a polymer effective to wet said first surface, and said positive active electrode material or precursor thereof.

10. The method of claim 1 wherein said matrix includes polymeric material.

11. The method of claim 10 wherein said polymeric material is hydrophobic.

12. The method of claim 10 wherein said polymeric material has increased polarity relative to polypropylene.

13. The method of claim 10 wherein said polymeric material is a thermoset polymeric material.

14. The method of claim 1 wherein said element further comprises an acid resistant substrate at least partially coated with an electrically conductive coating, said substrate being at least partially embedded in said matrix.

15. The method of claim 14 wherein a portion of said coated substrate extends outwardly from said first surface of said matrix and into said positive active electrode material.

16. The method of claim 14 wherein said acid resistant substrate is glass and said coating is doped tin oxide.

17. The method of claim 1 wherein said positive active electrode material contains electrochemically active lead oxide material.

18. The method of claim 1 wherein said positive active e material is applied to said first surface as an aqueous mixture containing said positive active electrode material or a precursor thereof.

19. The method of claim 1 wherein said positive active electrode material is associated with said first surface by curing said positive active electrode material or a precursor thereof after said positive active electrode material or precursor thereof is applied to said first surface.

20. The method of claim 1 wherein said battery element is useful as a bipolar plate in a lead-acid battery, and further comprises a fluid impervious conductive layer that is resistant to reduction adjacent to said second surface of said matrix material.

21. The method of claim 20 wherein said conductive layer is selected from the group consisting of metals substantially non-conductive polymers containing conductive materials, and mixtures thereof.

22. The method of claim 21 wherein said conductive layer is a non-conductive polymer containing particles of a material selected from the group consisting of graphite, lead and mixtures thereof.

23. The method of claim 20 wherein said battery element further comprises a negative active electrode layer located adjacent to said fluid impervious conductive layer.

24. The method of claim 23 wherein said negative active electrode layer comprises a paste containing lead.

25. A battery element useful as at least a positive plate in a lead-acid battery comprising: a fluid impervious, electrically conductive matrix having mutually opposing first and second surfaces, said first surface being conditioned to render said first surface more wettable by said positive active electrode material or a precursor thereof; and positive active electrode material associated with said first surface and being situated in a plurality of segments.

26. The battery element of claim 25 which further comprises segmenting means associated with said first surface and acting to partially define said plurality of segments in which said positive active electrode material is located.

27. The battery element of claim 25 wherein each of said segments is in the range of about 0.1 square inch to about 2.5 square inches in area.

28. The battery element of claim 26 wherein said segmenting means is made of a material selected from the group consisting of lead and polymers.

29. The battery element of claim 26 wherein said segmenting means is made of a material selected from the group consisting of polymers.

30. The battery element of claim 36 wherein said matrix includes a polymeric material.

31. The battery element of claim 30 wherein said segmenting means includes polymer material having substantially the same composition as said polymeric material included in said matrix.

32. The battery element of claim 30 wherein said polymeric material has increased polarity relative to polypropylene.

33. The battery element of claim 30 wherein said polymeric material is hydrophobic.

34. The battery element of claim 30 wherein said polymeric material is a thermoset polymeric material.

35. The battery element of claim 25 which further comprises an acid resistant substrate at least partially coated with an electrically conductive coating, said substrate being at least partially embedded in said matrix.

36. The battery element of claim 35 wherein said acid resistant substrate is glass and said coating is fluorine doped tin oxide.

37. The battery element of claim 35 wherein said acid resistant substrate is glass and said coating is doped tin oxide.

38. The battery element of claim 25 wherein said positive active electrode material contains electrochemically active lead oxide material.

39. The battery element of claim 25 wherein said battery element is useful as a bipolar plate in a lead-acid battery, and further comprises a fluid impervious conductive layer that is resistant to reduction adjacent to said second surface of said matrix material.

40. The battery element of claim 39 wherein said conductive layer is selected from the group consisting of metals, substantially non-conductive polymers containing conductive materials, and mixtures thereof.

41. The battery element of claim 40 wherein said conductive layer is a non-conductive polymer containing particles of a material selected from the group consisting of graphite, lead and mixtures thereof.

42. The battery element of claim 39 wherein said battery element further comprises a negative active electrode layer located adjacent to said fluid impervious conductive layer.

43. The battery element of claim 42 wherein said negative active electrode layer comprises a paste containing lead.

44. A battery element useful as at least a positive plate in a lead-acid battery comprising a fluid impervious, electrically conductive matrix having mutually opposing first and second surfaces, and positive active electrode material associated with said first surface of said matrix, provided that said first surface is conditioned to render said first surface more wettable by said positive active electrode material or a precursor thereof to enhance said association.

45. The battery element of claim 44 wherein said first surface is conditioned prior to said positive active electrode material being associated therewith.

46. The battery element of claim 44 wherein said positive active electrode material is adhered to said first surface of said matrix and said first surface is conditioned prior to said positive active electrode material being adhered thereto to enhance said adhesion.

47. The battery element of claim 44 wherein said matrix includes a polymeric material.

48. The battery element of claim 47 wherein said polymeric material has increased polarity relative to polypropylene.

49. The battery element of claim 47 wherein said polymeric material is hydrophobic.

50. The battery element of claim 47 wherein said polymeric material is a thermoset polymeric material.

51. The battery element of claim 44 which further comprises an acid resistant substrate at least partially coated with an electrically conductive coating, said substrate being at least partially embedded in said matrix.

52. The battery element of claim 51 wherein said portion of said coated substrate extends outwardly from said first surface of said matrix and into said positive active electrode material.

53. The battery element of claim 51 wherein said acid resistant substrate is glass and said coating is doped tin oxide.

54. The battery element of claim 44 wherein said positive active electrode material contains electrochemically active lead oxide material.

55. The battery element of claim 44 wherein said battery element is useful as a bipolar plate in a lead-acid battery, and further comprises a fluid impervious conductive layer that is resistant to reduction adjacent to said second surface of said matrix material.

56. The battery element of claim 55 wherein said conductive layer is selected from the group consisting of metals, substantially non-conductive polymers containing conductive materials, and mixtures thereof.

57. The battery element of claim 56 wherein said conductive layer is a non-conductive polymer containing particles of a material selected from the group consisting of graphite, lead and mixtures thereof.

58. The battery element of claim 55 wherein said battery element further comprises a negative active electrode layer located adjacent to said fluid impervious conductive layer.

59. The battery element of claim 58 wherein said negative active electrode layer comprises a paste containing lead.

60. The battery element of claim 25 wherein said first surface is conditioned by a method which comprises contacting said first surface with a wetting agent.

61. The battery element of claim 25 wherein said first surface is conditioned to increase the hydrophilic nature of said first surface.

62. The battery element of claim 25 wherein said first surface is conditioned by a method which comprises subjecting said first surface to the action of a plasma.

63. The battery element of claim 28 wherein said matrix includes a polymeric material selected from the group consisting of phenol-formaldehyde polymers.

64. The battery element of claim 44 wherein said first surface is conditioned by a method which comprises contacting said first surface with a wetting agent.

65. The battery element of claim 44 wherein said first surface is conditioned to increase the hydrophilic nature of said first surface.

66. The battery element of claim 44 wherein said first surface is conditioned by a method which comprises subjecting said first surface to the action of a plasma.

67. The battery element of claim 44 wherein said matrix includes a polymeric material selected from the group consisting of phenol-formaldehyde polymers.

68. The battery element of claim 51 wherein said acid resistant substrate is glass and said coating is fluorine doped tine oxide.

69. A battery element useful as at least a positive plate in a lead-acid battery comprising: a fluid impervious, matrix having mutually opposing first and second surfaces; an acid resistant substrate at least partially coated with an electrically conductive coating, said substrate being at least partially embedded in said matrix; and positive active electrode material associated with said first surface and being situated in a plurality of segments.

70. The battery element of claim 69 which further comprises segmenting means acting to partially define said plurality of segments in which said positive active electrode material is located.

71. The battery element of claim 70 wherein said segmenting means is made of a material selected from the group consisting of lead and polymers.

72. The battery element of claim 70 wherein said segmenting means is made of a material selected from the group consisting of polymers.

73. The battery element of claim 69 wherein said acid substrate is glass and said coating is doped tin oxide.

74. The battery element of claim 70 wherein said acid resistant substrate is glass and said coating is fluorine doped tin oxide.

75. A battery element useful as a bipolar plate in a lead-acid battery comprising: a fluid impervious, electrically conductive matrix having mutually opposing first and second surfaces; positive active electrode material associated with said first surface and being situated in a plurality of segments; and a fluid impervious conductive layer that is resistant to reduction and is located adjacent to said second surface of said matrix.

76. The battery element of claim 75 wherein said conductive layer is selected from the group consisting of metals, substantially non-conductive polymers containing conductive materials and mixtures thereof.

77. The battery element of claim 75 wherein said conductive layer is selected from the group consisting of lead and non-conductive polymers containing particles of a material selected from the group consisting of graphite, lead and mixtures thereof.

78. The battery element of claim 75 which further comprises a negative active electrode located adjacent to said fluid impervious conductive layer.

79. The battery element of claim 78 wherein said negative active electrode layer comprises a paste containing lead.

80. The battery element of claim 75 which further comprises segmenting means acting to partially define said plurality of segments in which said positive active electrode material is located.

81. The battery element of claim 80 wherein said segmenting means is made of a material selected from the group consisting of lead and polymers.

82. The battery element of claim 80 wherein said segmenting means is made of a material selected from the group consisting of polymers.

83. The battery element of claim 75 wherein said matrix includes a polymeric material selected from the group consisting of phenol-formaldehyde polymers.

84. The battery element of claim 75 which further comprises an acid resistant substrate at least partially coated with an electrically conductive coating, said substrate being at least partially embedded in said matrix.

85. The battery element of claim 84 wherein said acid resistant substrate is glass and said coating is doped tin oxide.

86. The battery element of claim 84 wherein said acid resistant substrate is glass and said coating is fluorine doped tin oxide.

* * * * *

UNITED STATES PATENT AND TRADEMARK OFFICE
CERTIFICATE OF CORRECTION

PATENT NO. : 4,861,689

DATED : August 29, 1989

INVENTOR(S) : Thomas J. Clough et al

It is certified that error appears in the above—identified patent and that said Letters Patent is hereby corrected as shown below:

Column 13, line 18; delete "attache" and insert --attach--

Column 16, line 44; delete "tine" and insert --tin--

Column 16, line 65; insert --resistant-- before "substrate"

Signed and Sealed this

Seventeenth Day of July, 1990

Attest:

HARRY F. MANBECK, JR.

*Attesting Officer*  Commissioner of Patents and Trademarks